(12) United States Patent
Kataoka

(10) Patent No.: US 9,276,385 B2
(45) Date of Patent: *Mar. 1, 2016

(54) ION GENERATOR PROVIDED WITH ION GENERATION UNITS AT RESPECTIVE AIR FLOW PASSAGES

(75) Inventor: Yasutaka Kataoka, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/238,410

(22) PCT Filed: Jun. 27, 2012

(86) PCT No.: PCT/JP2012/066373
§ 371 (c)(1),
(2), (4) Date: Feb. 11, 2014

(87) PCT Pub. No.: WO2013/031359
PCT Pub. Date: Mar. 7, 2013

(65) Prior Publication Data
US 2014/0197332 A1 Jul. 17, 2014

(30) Foreign Application Priority Data
Aug. 31, 2011 (JP) .................................. 2011-189955

(51) Int. Cl.
*H01T 23/00* (2006.01)
*F24F 7/00* (2006.01)
(Continued)

(52) U.S. Cl.
CPC . *H01T 23/00* (2013.01); *F24F 7/00* (2013.01); *H01J 27/022* (2013.01); *F24F 2003/1635* (2013.01); *F24F 2003/1682* (2013.01)

(58) Field of Classification Search
CPC ....... H01J 27/02; H01J 27/022; H01J 27/028; H01J 27/08; H01J 37/08; H01J 45/00
USPC ...................... 250/423 R, 424, 426
See application file for complete search history.

(56) References Cited

U.S. PATENT DOCUMENTS 4,333,123 A * 6/1982 Moulden ........................ 361/213
6,221,160 B1 * 4/2001 Lin ................................ 118/326
(Continued)

FOREIGN PATENT DOCUMENTS

CN 101175510 A 5/2008
JP 9-213493 A 8/1997
(Continued)

OTHER PUBLICATIONS

International Search Report issued in PCT/JP2012/066373, mailed on Sep. 25, 2012.
(Continued)

*Primary Examiner* — Jack Berman
*Assistant Examiner* — Jason McCormack
(74) *Attorney, Agent, or Firm* — Birch, Stewart, Kolasch & Birch, LLP

(57) ABSTRACT

Two flow passages are provided for allowing the passage of air sent out from a blower in the same direction individually and discharging the air to outside. An ion generation unit for generating positive ions by only corona discharge is arranged at one flow passage, and an ion generation unit for generating electrostatic atomized water particles with negative polarity by electrostatic atomizing phenomenon is arranged at the other flow passage. A throttle is provided at the one flow passage for making the wind speed of air flowing through the one flow passage faster than the wind speed of air flowing through the other flow passage. Since positive ions having shorter lifetime are emitted more than electrostatic atomized water particles with negative polarity having longer lifetime, the balance between positive and negative polarities in the air can be sustained over a long period of time.

5 Claims, 6 Drawing Sheets

(51) Int. Cl.
*H01J 27/02* (2006.01)
*F24F 3/16* (2006.01)

(56) References Cited

U.S. PATENT DOCUMENTS

| | | | |
|---|---|---|---|
| 2004/0130271 | A1 | 7/2004 | Sekoguchi et al. |
| 2004/0253417 | A1 | 12/2004 | Sekoguchi et al. |
| 2007/0107452 | A1* | 5/2007 | Kim et al. ............... 62/264 |
| 2011/0155922 | A1 | 6/2011 | Funabiki et al. |
| 2011/0257870 | A1* | 10/2011 | Nishioka et al. ......... 701/104 |
| 2012/0014840 | A1 | 1/2012 | Hanai et al. |
| 2012/0085921 | A1* | 4/2012 | Nishida ................... 250/424 |
| 2013/0095000 | A1* | 4/2013 | Yamamoto et al. ...... 422/123 |
| 2013/0126749 | A1* | 5/2013 | Mamiya et al. ....... 250/423 R |

FOREIGN PATENT DOCUMENTS

| | | |
|---|---|---|
| JP | 2001-35686 A | 2/2001 |
| JP | 2002-319472 A | 10/2002 |
| JP | 2003-47651 A | 2/2003 |
| JP | 2003-161494 A | 6/2003 |
| JP | 2009-036408 A | 2/2009 |
| JP | 2010-51398 A | 3/2010 |
| JP | 2010-55960 A | 3/2010 |
| JP | 2010-080425 A | 4/2010 |
| JP | 2010-80431 A | 4/2010 |
| JP | 2010-118351 A | 5/2010 |
| JP | 2011-033293 A | 2/2011 |
| JP | 2011-060705 A | 3/2011 |
| WO | WO 2010146966 A1 * | 12/2010 |

OTHER PUBLICATIONS

International Search Report mailed Sep. 13, 2011 for International Patent Application No. PCT/JP2011/063316.
U.S. Notice of Allowance mailed Feb. 26, 2015 from related U.S. Appl. No. 13/812,955.
U.S. Office Action dated Nov. 19, 2014 from related U.S. Appl. No. 13/812,955.

* cited by examiner

ION GENERATOR PROVIDED WITH ION GENERATION UNITS AT RESPECTIVE AIR FLOW PASSAGES

CROSS-REFERENCE TO RELATED APPLICATIONS

This application is the national phase under 35 U.S.C. §371 of PCT International Application No. PCT/JP2012/66373 which has an International filing date of Jun. 27, 2012 and designated the United States of America.

FIELD

The present invention relates to an ion generator for discharging ions generated by an ion generation unit along with air sent out from a blower to an indoor space and the like.

BACKGROUND

An ion generator includes a blower, a housing having two flow passages for allowing the passage of air sent out from the blower in the same direction individually and discharging the air to outside, and ion generation units attached to a channel wall of each of the flow passages respectively and generating ions. The ion generator discharges the ions (positive ions and negative ions) generated by the ion generation units and the air flowing through the flow passages to an indoor space so that bacteria floating in air is eliminated and virus is inactivated (for example, Japanese Patent Application Laid-Open No. 2010-80425). The ion generation unit has a needle-shaped discharge electrode and a voltage application part which applies a voltage to the discharge electrode, and ions are generated by corona discharge from the discharge electrode.

Japanese Patent Application Laid-Open No. 2011-33293 describes that an electrostatic atomization apparatus (ion generator) is configured such that a discharge electrode is coupled to one surface of a Peltier element where the one surface absorbs heat due to an applied voltage and the other surface emits heat; a heat sink with a radiation fin is coupled to the other surface of the Peltier element; the discharge electrode is cooled by a voltage applied to the Peltier element; the moisture in air is condensed on the tip of the discharge electrode; an electrostatic atomizing phenomenon occurs on the tip of the discharge electrode by a voltage applied to the discharge electrode; and then electrostatic atomized water particles with negative polarity are generated.

SUMMARY

However, in the ion generator provided with ion generation units at two flow passages respectively as disclosed in Japanese Patent Application Laid-Open No. 2010-80425, the wind speeds of air flowing through the two flow passages respectively are approximately the same. The ion generator is configured such that the amount of ions in air is controlled by varying wind speed at each of the flow passages.

Therefore, according to the ion generator provided with an ion generation unit generating positive ions arranged at the one of two flow passages and an ion generation unit generating negative ions arranged at the other flow passage, since the lifetimes of positive and negative ions are at the same level, positive and negative ions are generated at the same amount and discharged at the same wind speed so that balance of positive and negative ions in air can be sustained over a predetermined time.

In addition, it is well-known that the lifetime of electrostatic atomized water particles with negative polarity discharged to air by the electrostatic atomization apparatus disclosed in Japanese Patent Application Laid-Open No. 2011-33293 is several times longer than the lifetime of positive ions discharged to air by the ion generator disclosed in Japanese Patent Application Laid-Open No. 2010-80425. Therefore, according to the ion generator configured to discharge ions from two respective flow passages such as in Japanese Patent Application Laid-Open No. 2010-80425, in a case where the ion generator is provided with an ion generation unit generating positive ions is arranged at the one flow passage and an ion generation unit generating electrostatic atomized water particles with negative polarity is arranged at the other flow passage and positive ions and electrostatic atomized water particles with negative polarity are discharged to the air, when the same amount of positive ions and electrostatic atomized particles water with negative polarity are discharged to the air, the amount of electrostatic atomized water particles with negative polarity becomes more than the amount of positive ions, hence, the balance between positive and negative polarities becomes worse.

In view of such circumstances in the present invention, the present invention aims to provide an ion generator capable of discharging more positive ions having shorter lifetime than electrostatic atomized water particles with negative polarity having relatively longer lifetime and sustaining the balance between positive and negative polarities in the air over a long period of time by providing means for making the wind speed of air around the ion generation unit flowing through one of the two flow passages faster than the wind speed of air around the ion generation unit flowing through the other flow passage even if positive ions and electrostatic atomized water particles with negative polarity having large difference in lifetimes are discharged from two flow passages.

An ion generator related to the present invention provides ions generating units generating ions at two flow passages respectively for allowing the passage of air sent out from a blower individually and discharging the air to outside. The ion generator includes means for making the wind speed of air around the ion generation unit flowing through one of the two flow passages faster than the wind speed of air around the ion generation unit flowing through the other flow passage. One of the ion generation units includes a discharge electrode where positive ions are generated by discharge, and the other ion generation unit includes a discharge electrode where electrostatic atomized water particles with negative polarity are generated by discharge.

With regard to this invention, even if the lifetime of the ions discharged from one flow passage is shorter than the lifetime of the electrostatic atomized water particles with negative polarity discharged from the other flow passage, since the wind speed in the flow passage transporting the ions having shorter lifetime is faster than the wind speed in the flow passage transporting the particles having longer lifetime, the invention is capable of making the emitted amount of positive ions having shorter lifetime more than the emitted amount of electrostatic atomized water particles with negative polarity having longer lifetime. Therefore, the invention can sustain the balance between positive and negative polarities in the air over a long period of time.

In addition, with regard to the ion generator related to the present invention, it is preferable that the means is configured to make the cross section area of the one flow passage in the flowing direction around the ion generation unit narrower than the cross section area of the other flow passage in the flowing direction around the ion generation unit.

Since this invention can make the wind speed faster by partially narrowing the cross section area of the one flow passage in the existing ion generator provided with two flow passages, the locations in need of improvement and the cost can be reduced.

Moreover, with regard to the ion generator related to the present invention, it is preferable to configure one of the ion generation units to be arranged at the position of the downstream side in the flowing direction in comparison to the means.

With regard to this invention, as the air flows through the location where the cross section area is narrow, since the wind speed readily becomes faster at the location where the cross section area is narrow, the emitted amount of positive ions having shorter lifetime can be still more.

Furthermore, with regard to the ion generator related to the present invention, it is preferable to configure the means as a bypass passage communicating with the other flow passage at the positions of upstream and downstream sides in the flowing direction with respect to the ion generation unit arranged at the other flow passage.

With regard to this invention, the air flowing through the other flow passage is diverted to two paths as the flow passage provided with an ion generation unit and the bypass passage. The wind speed of air around the ion generation unit flowing through the flow passage provided with the ion generation unit is relatively slower than the wind speed of air around the ion generation unit flowing through the one flow passage. Consequently, the wind speed of air around the ion generation unit flowing through the one flow passage becomes relatively faster than the wind speed of air around the ion generation unit flowing through the other flow passage so that the emitted amount of positive ions having shorter lifetime can be generated more. Moreover, since the wind speed can be made relatively faster by providing a bypass passage at the other flow passage in the existing ion generator having two flow passages, the locations in need of improvement and the cost can be reduced.

According to the present invention, even if the lifetime of positive ions discharged from one of the two flow passages is shorter than the lifetime of electrostatic atomized water particles with negative polarity discharged from the other flow passage, the present invention is capable of generating the emitted amount of positive ions having shorter lifetime more than the emitted amount of electrostatic atomized water particles with negative polarity having longer lifetime and sustaining the balance between positive and negative polarities in the air over a long period of time because the wind speed in the flow passage transporting positive ions having shorter lifetime is faster than the wind speed in the flow passage transporting electrostatic atomized water particles having longer lifetime.

The above and further objects and features will more fully be apparent from the following detailed description with accompanying drawings.

DETAILED DESCRIPTION

The invention below is described in detail based on the drawings showing the embodiments.

Embodiment 1

Figure 1:
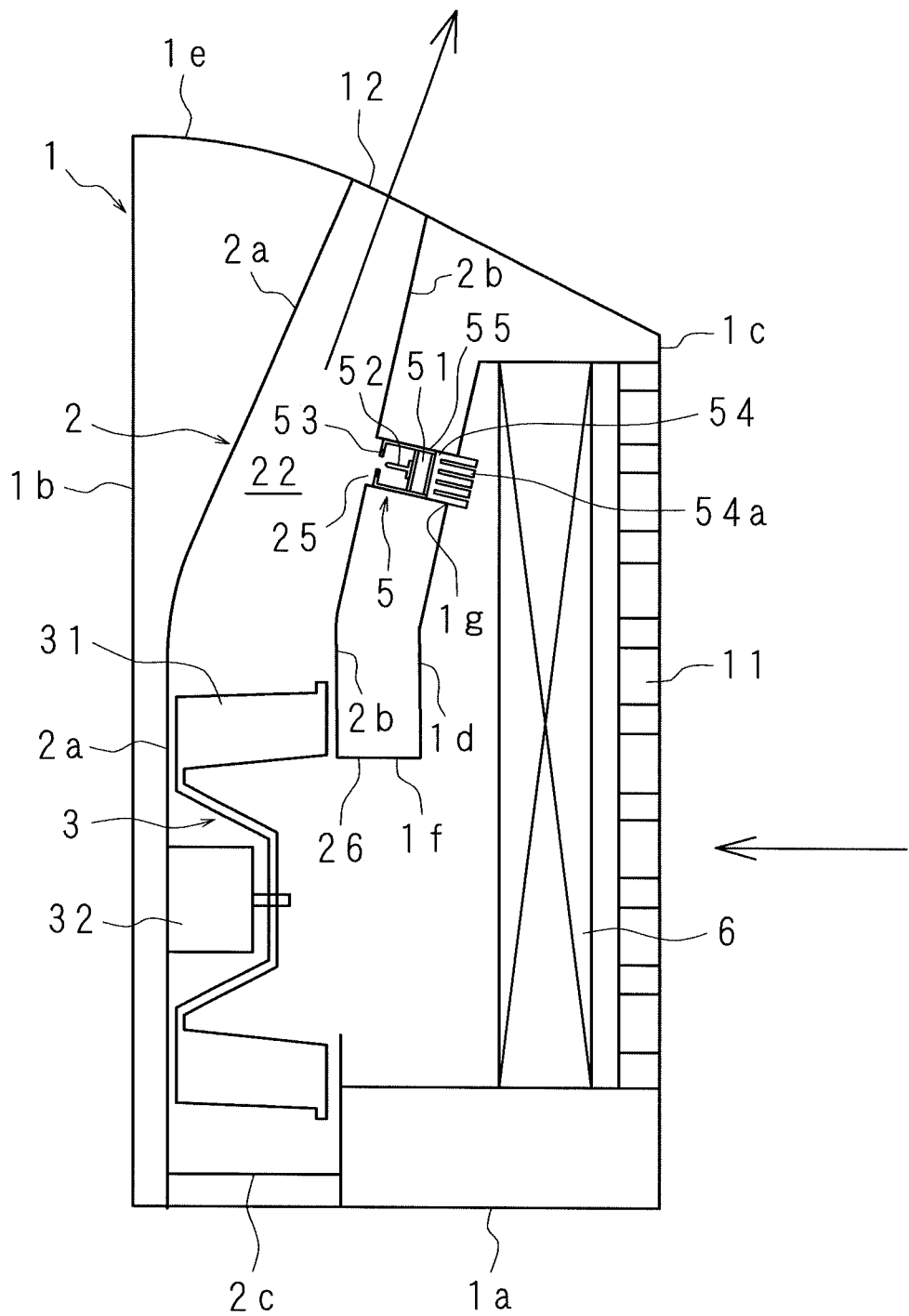
FIG. 1 is a cross sectional side view showing a configuration of an ion generator in accordance with the present invention.
Figure 2:
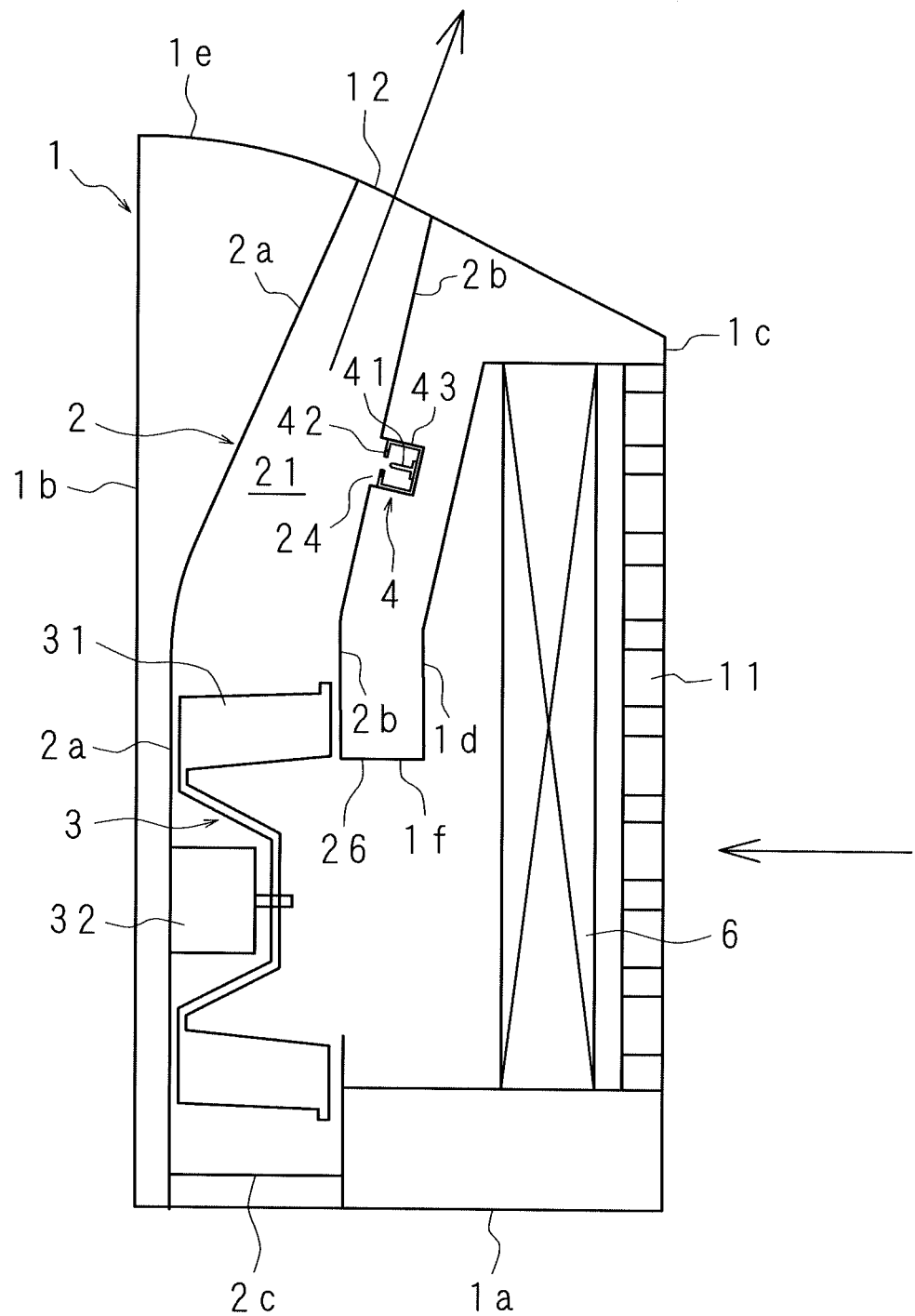
FIG. 2 is a cross sectional side view showing a configuration of another part of the ion generator in accordance with the present invention.
Figure 3:
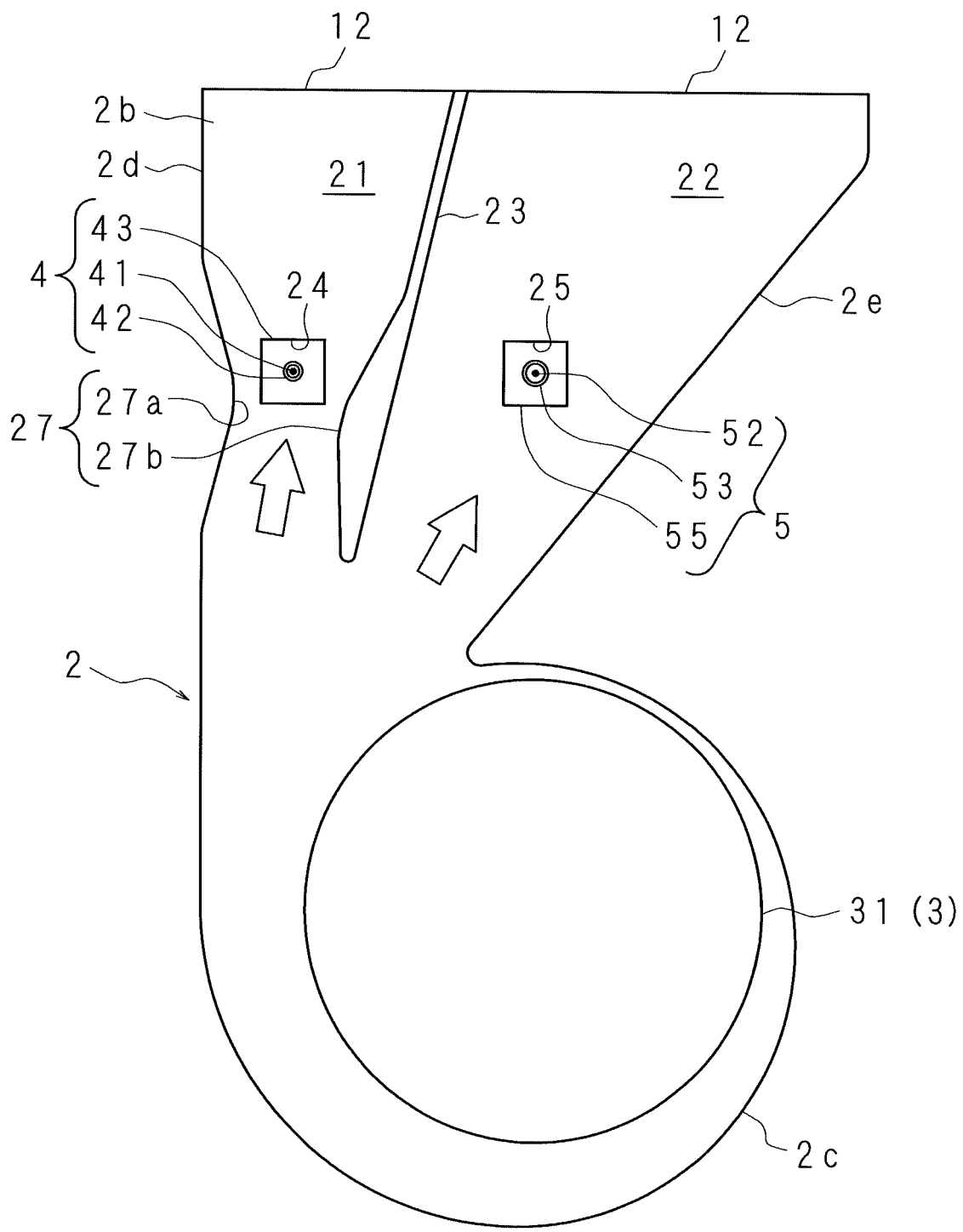
FIG. 3 is a cross sectional front view showing the configuration of the ion generator in accordance with the present invention.

FIG. 1 is a cross sectional side view showing a configuration of an ion generator related to the present invention. FIG. 2 is a cross sectional side view showing a configuration of another part of the ion generator. FIG. 3 is a cross sectional front view showing the configuration of the ion generator.

The ion generator shown in FIG. 1 includes a housing 1 having a suction port 11 on a lower rear face and an outlet 12 at an upper part, a casing 2 fitted into the housing 1, a blower 3 arranged at a lower part inside the casing 2, and two ion generation units 4, 5 arranged between the blower 3 inside the housing 1 and the outlet 12.

The housing 1 is formed of an approximately parallelepiped shape having a base wall 1a with a rectangular shape in a plan view, a front wall 1b and a back wall 1c continued to two sides of the base wall 1a, side walls continued to the other two sides of the base wall 1a, an intermediary wall 1d arranged between the front wall 1b and the back wall 1c, and a ceiling wall 1e. The suction port 11 is formed at the back wall 1c, and the outlet 12 is formed at the ceiling wall 1e.

The intermediary wall 1d is formed with a dish-liked shape and continued to an edge of the suction port 11, a communication hole 1f is formed at the location opposed to the blower 3 at the lower part, and a hole 1g is formed at the location opposed to one ion generation unit 4 at the upper part. At the location opposed to the suction port 11 inside the intermediary wall 1d, a filter 6 is installed for allowing the passage of air sucked from the suction port 11 by the blower 3, eliminating contaminants in the air and then purifying the air. In addition, an operation unit including a plurality of switches such as an operation switch and a display means such as a lamp is provided at one side of the outlet 12 on the ceiling wall 1e of the housing 1.

The casing 2 is arranged between the front wall 1b and the intermediary wall 1d of the housing 1. The casing 2 includes a front wall 2a and a back wall 2b which are opposed separated in back and forth directions, a curved guide wall 2c arranged at the lower part between the front wall 2a and the back wall 2b, and two side walls 2d, 2e continued to the top edge of the curved guide wall 2c, and the upper part of the casing 2 opens to the outlet 12. Two flow passages 21, 22 are formed by a partition wall 23 among the front wall 2a, the back wall 2b and the side walls 2d and 2e. The front wall 2a and the back wall 2b at the flow passages 21, 22 respectively are slightly tilted backward toward the outlet 12, and the cross section area on the side of the outlet 12 of the flow passages 21, 22 become narrower than the cross section area on the side of the blower 3.

The one side wall 2d is arranged almost directly upward from one edge of the curved guide wall 2c, and the other side wall 2e is arranged tilted toward the tangential direction of an impeller arranged rotatably in the inner side of the curved guide wall 2c from the other edge of the curved guide wall 2c.

Holes 24, 25 are formed at the vertically-center part of the back wall 2b at the flow passages 21, 22. A suction hole 26 continued to the edge of a communication hole 1f is formed at the lower part of the back wall 2b.

The partition wall 23 is arranged between the side walls 2d, 2e. The one flow passage 21 is formed between the partition wall 23 and the side wall 2d, and the other flow passage 22 is formed between the partition wall 23 and the side wall 2e. At the intermediate part of the flow passage 21 in the flowing direction, a throttle 27 is provided for making the wind speed of air flowing through the flow passage 21 faster than the wind speed of air flowing through the other flow passage 22.

The throttle 27 is composed of curved concave parts 27a, 27b provided at the side of the flow passage 21 in the partition wall 23 21 and the side wall 2d. The cross section area of the throttle 27 in the flow passage 21 becomes narrower than the cross section area of the rest part thereof and the cross section area of the flow passage 22, and the one hole 24 is formed at a position separated somewhat from the narrowest point of the throttle 27 to a downstream side of the flowing direction (side of the outlet 12). The one ion generation unit 4 is arranged at the hole 24.

The blower 3 includes an impeller 31 which is accommodated rotatably around a rotating shaft in a direction of back and forth in the curved guide wall 2c of the casing 2, and an electric motor 32 for driving the impeller 31. The electric motor 32 is attached to the front wall 2a of the casing 2. The impeller 31 is a sirocco fan, and the air sent out by the rotation of the impeller 31 is discharged from the outlet 12 to outside through the flow passages 21, 22. In addition, the side wall 2e is arranged tangentially to one location in a circumferential direction of the impeller 31.

With regard to the ion generation units 4, 5, the one ion generation unit 4 generates positive ions by corona discharge, and the other ion generation unit 5 generates electrostatic atomized water particles with negative polarity by an electrostatic atomizing phenomenon. The lifetime of positive ions in the air is shorter than the lifetime of electrostatic atomized water particles in the air.

The one ion generation unit 4 includes a discharge electrode 41 facing to the flow passage 21 through the hole 24 of the casing 2, an induction electrode ring 42 separated from and opposed to the tip part of discharge electrode 41, and a holding case 43 for holding the discharge electrode 41 and the induction electrode ring 42. The ion generation unit 4 is configured such that the discharge electrode 41 performs corona discharge by applying a voltage to the discharge electrode 41 and the induction electrode ring 42 and then generates positive ions. With regard to the ion generation unit 4, the holding case 43 is attached to the casing 2 such that the discharge electrode 41 and the induction electrode ring 42 face to the flow passage 21 through the hole 24 of the casing 2.

The other ion generation unit 5 includes a Peltier element 51 where the one surface absorbs heat due to an applied voltage and the other surface emits heat, a rod-shaped discharge electrode 52 which is coupled to the one surface of the Peltier element 51 and faces to the flow passage 22 through the hole 25 of the casing 2, an induction electrode ring 53 which is separated from and opposed to the tip part of discharge electrode 52, a heat sink 54 where the one surface has a plurality of radiating fins 54a and the other surface is coupled to the other surface of the Peltier element 51, and a holding case 55 for holding the Peltier element 51 and the induction electrode ring 53. The ion generation unit 5 is configured such that the discharge electrode 52 is cooled down by applying a voltage to the Peltier element 51, and then a moisture in the air condenses on the tip part of the discharge electrode 52, an electrostatic atomizing phenomenon occurs at the tip part of the discharge electrode 52 by applying a voltage to the discharge electrode 52 so that electrostatic atomized water particles with negative polarity are generated. With regard to the ion generation unit 5, the holding case 55 is attached to the casing 2 such that the discharge electrodes 52 and the induction electrode ring 53 face to the flow passage 22 through the hole 25 of the casing 2, the radiating fins 54a of the heat sink 54 is exposed to the air suction passage at the inner side of the intermediary wall 1d through the hole 1g of the intermediary wall 1d, and the sucked air flowing through the air suction passage is cooled down.

A driving operation of the ion generator configured as described above is explained. The ion generator is disposed at the vicinity of a wall inside a residential room such that the suction port 11 is at the wall side. The ion generation units 4, 5 and the blower 3 initiates driving by manipulating the operation switch arranged in the operation unit. The impeller 31 of the blower 3 rotates around an output shaft of the electric motor shown in FIG. 3 in a clockwise direction. The air sucked from the suction port 11 through the filter 6 due to the impeller 31 is inducted by the curved guide wall 2c of the casing 2 and sent to the two flow passages 21, 22 at the top.

Since the ion generation unit 4 which generates positive ions by corona discharge is arranged at the one flow passage 21, the ion generation unit 4 generates positive ions in the air flowing upward along the flow passage 21. The air containing the positive ions flows upward through the flow passage 21, and is discharged to the residential room from the outlet 12.

Since the ion generation unit 5 which generates electrostatic atomized water particles with negative polarity by an electrostatic atomizing phenomenon is arranged at the other flow passage 22, the ion generation unit 5 generates electrostatic atomized water particles with negative polarity in the air flowing upward along the flow passage 22. The air containing the electrostatic atomized water particles flows upward through the flow passage 22, and is discharged to the residential room from the outlet 12.

When the positive ions flowing along the flow passage 21 and the electrostatic atomized water particles with negative polarity flowing along the flow passage 22, as the throttle 27 is provided on the arrangement part of the ion generation unit 4 at the intermediate part of the flow passage 21 in the flowing direction in which the ion generation unit 4 is arranged for generating positive ions with shorter lifetime, since the wind speed of air with positive ions flowing through the one flow passage 21 due to the throttle 27 is faster than the wind speed of the air with electrostatic atomized water particles with longer lifetime flowing through the other flow passage 22, the emitted amount of positive ions with shorter lifetime can be generated more than the emitted amount of electrostatic atomized water particles with longer lifetime. Therefore, the balance between positive and negative polarities in the air can be sustained over a long period of time.

Embodiment 2

Figure 4:
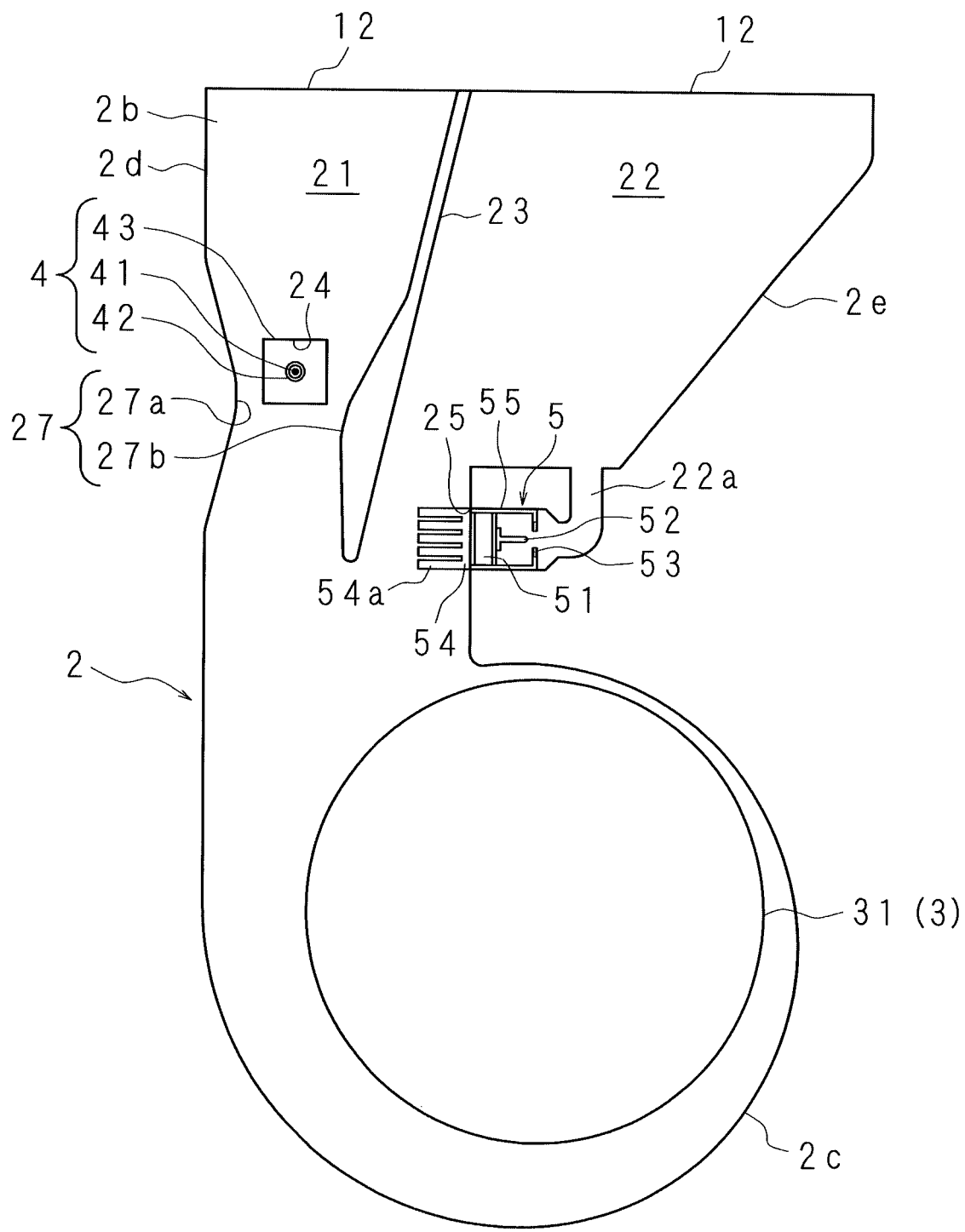
FIG. 4 is a cross sectional front view showing another configuration of an ion generator in accordance with the present invention.

FIG. 4 is a cross sectional front view showing another configuration of an ion generator in accordance with the present invention. With regard to the ion generator, an ion generation unit 4 is attached to a back wall 2b of a casing 2 for generating positive ions, an ion generation unit 5 is attached to a side wall 2e of the casing 2 for generating electrostatic atomized water particles, and a heat sink 54 of the ion generation unit 5 faces to a flow passage 22, and the discharge electrode 52 and the induction electrode ring 53 face to a communication passage 22a communicating with the flow passage 22.

A hole 25 communicating with the flow passage 22 is provided at the side wall 2e of the casing 2. In addition, a communication passage 22a which communicates with the hole 25 and opens to the flow passage 22 at the position distant to the downstream side (the side of an outlet 12) in the flowing direction, is provided at the side wall 2e of the casing 2. A holding case 55 is attached to the side wall 2e such that a heat sink 54 faces to the flow passage 22 through the hole 25, and the discharge electrode 52 and the induction electrode ring 53 face to the flow passage 22 through the communication passage 22a.

With regard to the embodiment, the heat sink 54 of the ion generation unit 5 is arranged at the flow passage 22. Since the heat sink 54 can be cooled by the air sent out from a blower 3 to the flow passage 22, the heat dissipation characteristics of the heat sink 54 can be enhanced.

As other configurations and operations are similar to Embodiment 1, the same reference numerals are appended to the same components, and the explanation of the detailed description and operation effect are omitted.

Embodiment 3

Figure 5:
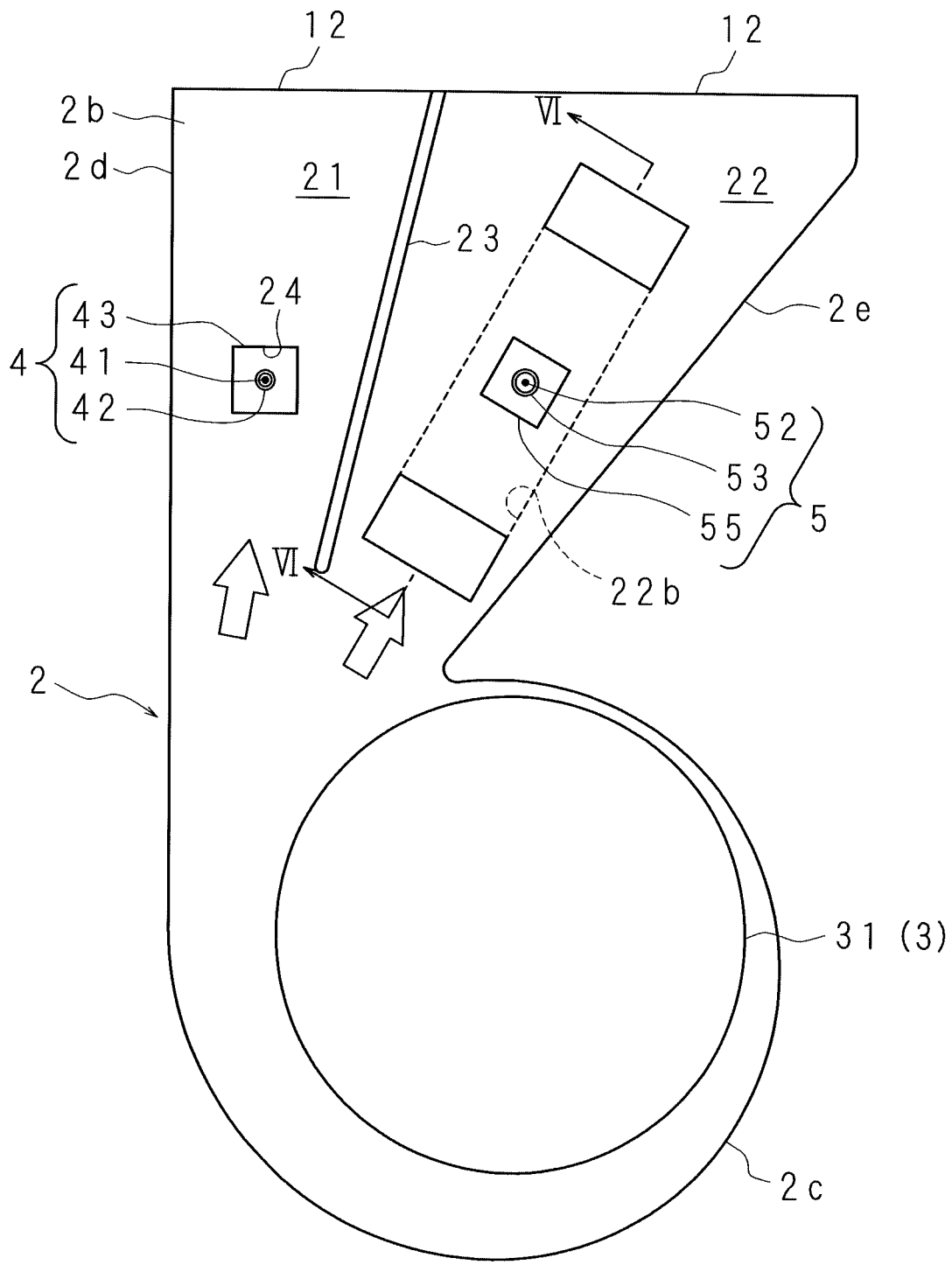
FIG. 5 is a cross sectional front view showing another configuration of an ion generator in accordance with the present invention.
Figure 6:
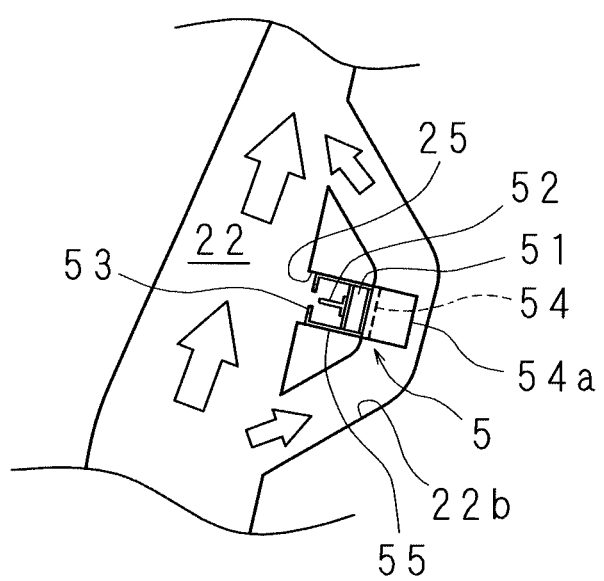
FIG. 6 is a cross sectional view taken along the VI-VI line of FIG. 5.

FIG. 5 is a cross sectional front view showing another configuration of an ion generator in accordance with the present invention, and FIG. 6 is a cross sectional view taken along the VI-VI line of FIG. 5. The ion generator provides a bypass passage 22b opening to the other flow passage 22 at the positions of upstream and downstream sides in the flowing direction with respect to an ion generation unit 5 arranged at the other flow passage 22, and the air flowing through the other flow passage 22 is diverted into two paths of the flow passage 22 provided with the ion generation unit 5 and the bypass passage 22b. The wind speed of air around the ion generation unit 4 flowing through the flow passage 22 in which the ion generation unit 5 is disposed becomes relatively slower than the wind speed of air around the ion generation unit 4 flowing through the one flow passage 21. Consequently, the wind speed of air around the ion generation unit 4 flowing through the one flow passage 21 becomes relatively faster than the wind speed of air around the ion generation unit 5 flowing through the other flow passage 22.

At the side of the flow passage 22 of a back wall 2b of a casing 2, a hole 25 communicating with the flow passage 22 and the bypass passage 22b communicating with the flow passage 22 at the positions distant to the downstream and upstream sides in the flowing direction from the hole 25 are provided. A holding case 55 is attached to the back wall 2b such that a discharge electrode 52 and an induction electrode ring 53 face to the flow passage 22 through the hole 25, and a heat sink 54 is arranged at the bypass passage 22b and is cooled by the air diverted from the flow passage 22 and flowing through the bypass passage 22b.

With regard to the embodiment, the wind speed and wind amount of air sent out to a room from an outlet 12 continued to the flow passage 22 can be maintained. In addition, the wind speed of air around the ion generation unit 4 flowing through the flow passage 21 can be made relatively faster than the wind speed of air around the ion generation unit 5 flowing through the flow passage 22. Moreover, the emitted amount of positive ions with shorter lifetime can be generated more than the emitted amount of electrostatic atomized water particles with negative polarity having longer lifetime. Therefore, the ion balance between positive and negative polarities in the air can be sustained over a long period of time.

As the wind speed at the discharge electrode 52 is too high, dew condensation hardly occurs on the tip part of the discharge electrode 52 and electrostatic atomized water particles with negative polarity are hardly generated. However, as the wind speed at the discharge electrode 52 can be made slower by the bypass passage 22b, dew condensation easily occurs on the tip part of the discharge electrode 52, and electrostatic atomized water particles with negative polarity are easily generated. In addition, the heat sink 54 is arranged at the bypass passage 22b and is cooled by the air sent out from the blower 3 to the flow passage 22, therefore, the heat dissipation characteristics of the heat sink 54 can be enhanced.

As other configurations and operations are similar to Embodiment 1, the same reference numerals are appended to the same components, and the explanation of the detailed description and operation effect are omitted.

In addition, the embodiments described above provide two flow passages 21, 22. The number of flow passages 21, 22 can be two or more, the number of the flow passages is not particularly restricted.

Moreover, the embodiments described above provide two flow passages 21, 22 at the sending side where one impeller 34 sends out air. The embodiment may be configured to have two flow passages at the sending side where two impellers, which are driven by one electric motor 32 or two electric motors, send out air respectively.

Furthermore, the ion generator related to the present invention may be incorporated into an air conditioner having at least one of a cooling function and a heating function. In this case, it becomes the air conditioner provided with an ion generator.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An ion generator provided with ion generation units generating ions at two flow passages respectively for allowing the passage of air sent out from a blower individually and discharging the air to outside comprising:
  a control section that makes the wind speed of air around the ion generation unit flowing through one of the two flow passages faster than the wind speed of air around the ion generation unit flowing through the other flow passage,
  wherein one of the ion generation units includes a discharge electrode where positive ions are generated by discharge, and the other ion generation unit includes a discharge electrode where electrostatic atomized water particles with negative polarity are generated by discharge.

2. The ion generator according to claim 1,
  wherein the control section is configured to make the cross section area of the one flow passage in the flowing direction around the ion generation unit narrower than the cross section area of the other flow passage in the flowing direction around the ion generation unit.

3. The ion generator according to claim 2,
  wherein the control section is a throttle.

4. The ion generator according to claim 1,
wherein one of the ion generation units is arranged at the position of the downstream side in the flowing direction in comparison to the control section.

5. The ion generator according to claim 1,
wherein the control section is configured to be a bypass passage communicating with the other flow passage at the positions of the upstream and downstream sides in the flowing direction with respect to the ion generation unit arranged at the other flow passage.

* * * * *